Patented July 11, 1944

2,353,613

UNITED STATES PATENT OFFICE 2,353,613

PROCESS FOR BENEFICIATION OF IRON ORES AND RECOVERY OF BY-PRODUCT VALUES

Daniel Gardner, New York, N. Y., assignor to Virginia Metal Industries, Inc., a corporation of West Virginia No Drawing. Application October 21, 1941, Serial No. 415,890

20 Claims. (Cl. 202—3)

This invention is a novel process for the beneficiation of iron ores and the recovery of byproduct values therefrom, such as nickel, cobalt, manganese and chromium or their compounds existing therein; the improvement providing methods of treatment to enrich certain widely distributed iron ores, especially those of relatively low grade and those containing valuable constituents other than iron.

The general object of the present invention is to afford a process of beneficiating iron ores which is well adapted to the profitable working of ores of low grade, but which naturally may if desired be employed upon richer ores. A particular object is to afford such a process adapted to economic operation for various iron ores, notwithstanding variations in the kinds of constituents therein and variations in the kinds of other materials or mineral gangues present and differences in the proportions of the several constituents per ton of ore.

A further object is to afford a process such as indicated which is adapted to operate by the use of known types of apparatus, or even to be performed by the use of existing plants laid out on prevailing principles. Further objects include greater efficiency and less complication of enriching treatment as compared with known processes; also to bring about a maximum yield of the enriched iron compounds; also to permit continuity of the process from the input of the ground ore to the output of the beneficiated product; and to recover in an industrially economic manner, from the raw material, other desired constituents, such as the valuable metals mentioned, which in part therefore may yield actual profits aiding materially towards covering the cost of production.

Other and further objects and advantages will be explained in the following description of embodiments of the invention, or will be understood to those conversant with the subject. To the attainment of such objects and advantages the present invention consists in the herein described process for beneficiating iron ores and for recovery of byproduct values therefrom, and in various features of procedure, steps, agents and reactions as herein disclosed.

Much prior effort has been expended, and numerous systems devised and practiced for effecting beneficiation of iron ores and recovering other values therefrom, but this general problem has not been solved with entire satisfaction and efficiency, in the sense of industrially successful and profitable operations. Among the processes attempted for such purposes are the following:

The patent of De Vecchis No. 2,119,270 of May 31, 1938, purports to provide a method for recovering iron values from the furnace residues available in the roasting of iron pyrites in the manufacture of sulfuric acid, such residues being in the nature of ashes which are otherwise waste material. The patentee passes the residue ashes, while still incandescent, and closed from the atmosphere, into a quenching bath of water; but if the sulfur content has not been burned out completely, the patentee furnishes to the hot material, during its passage through a conduit from the furnace to a quenching bath, a measured limited quantity of air, just sufficient to consume completely the sulfur present. Thereafter the quenched material is again crushed and then subjected to separation of the portion containing iron, said to be ferric oxide, separable by magnetic action. In contrast the present invention is usually worked from the original crushed ore and proceeds by quite a different sequence of steps, in a continuous process, at much lower temperatures than those required by the patentee, and with special agents not disclosed by the patentee.

The Davis Patent No. 2,257,110 of September 30, 1941, discloses a vertical tubular furnace for beneficiating iron ores including converting hematite to magnetite. Coarse ore, ¾ inch, is preheated and joined at the reducing zone by a less quantity of ¼ inch ore. No other solids are in mixture and for reduction purposes gases containing carbon and/or hydrogen are flowed up through the descending ore. Temperatures of about and above 1000° C. are mentioned. The furnace lower end is sealed by dipping into the water in a quenching vessel. This plan like the one previously mentioned is quite remote from the present process.

The present invention will next be outlined, commencing with a general discussion of natural ores available and various practical considerations involved.

Only a limited number of regions are possessed of high grade magnetite or hematite ores which can directly go into iron production. However, some of the other iron ores that are plentiful in some regions contain other valuable constituents or byproducts for which there exists a regular and extensive market. The practical worth however of such ores is dependent upon the ability economically to extract and separate these byproduct contents. The nature of the iron ore to be treated is likely to vary from case to case, so that it is necessary that the various oxide, sulphide and other ores can be treated successfully, in an industrial sense, which is the main purpose of this invention, as will be further seen from the description of the enrichment method hereof.

This invention pertains to a method permitting the continuous beneficiation of iron ores and the simultaneous recovery of other valuable contents which may exist in the treated ore. Under the general method hereof the ore is preliminarily crushed and ground, passed through a sieve to ensure a powdery condition and intimately mixed with certain agents, including powdered carbonaceous material, together with a basic hydroxide, such as hydrated or slaked lime or barium hydroxide, these in substantial proportions as will be more fully indicated.

The intimate mixture described is fed into and through a furnace, preferably a downslanted rotary kiln, in which a well controlled treating temperature is upheld, and a nonoxidizing atmosphere is maintained. The length of the kiln depends upon the amount of material passed through the kiln, the speed of advance and the duration of treatment. The rotation is preferably slow, in order to ensure that during the stay in the furnace the total quantity of the materials is heated up to the required temperature, and subjected to prolonged treatment at such temperature. The heat preferably is applied exteriorly to the kiln, but in any case without flames contacting the treated mix, as by inside firetubes or electric heat units.

From the kiln, and in absence of air and oxygen, the hot mixture is caused to pass into a bath where it undergoes a brutal quenching with cold liquid, usually water; and from there it is thereupon introduced into a separator, of any suitable kind, adapted to separate from the solid mixture the desired compounds of iron and other metals. While leaching may be employed preferably gravity classification is indicated, by the use of which the oxides of the iron and other valuable metals may be accumulated in the bottom part of the separator, whereas the residue materials or gangues are caused progressively to be carried away, for example gradually to rise and overflow, the values thus becoming completely separated.

As thus carried out, under proper treatment conditions, for example as hereinafter described, the iron content is obtained in form of ferrosoferric oxide, corresponding to magnetite, $Fe_3O_4$, with a density of 5.18; and together with the iron compound are to be found, if the byproduct metals are present in the original ore, one or more of the oxides of manganese, chromium, nickel and cobalt. The separation of the iron oxide from these other oxides can effectively be carried out by means of magnetic separation, or by leaching or any other suitable known step, as later further described.

Among the important characteristics of the process are the continuity of operations; the treatment of the mixture at a definite moderate temperature; the inclusion of hydrated lime or barium hydroxide in the mix; the performing of the reactions in a continuous current of non-oxidizing gas, preferably steam; and the quenching of the hot mixture with cold water preferably saturated with hydrated lime or barium hydroxide; all of these operations being carried out in the continued absence of air or other oxidizing medium. It is possible to include the hydrated lime agent in the mix in all cases when the process can be worked at a temperature not exceeding 500 to 550° C., whereas by using barium hydroxide it is possible to carry up higher the temperature, although not exceeding 750°. In all cases the temperature is to be well below that at which softening, fusing or agglomerating of mineral contents tends to occur thereby to maintain the finely subdivided condition of the mix. Throughout this specification temperatures are given upon the centigrade system.

In the case of treating sulphide raw material or ore, containing ferric or ferrous sulphide, and as well other sulphides, as of nickel, a special factor exists in that it is believed that nickel (also cobalt) has more affinity for sulphur than has iron, whereas the affinity of these metals for oxygen are in the reverse order; a condition herein utilized.

Further and preferred details of the present process are set forth in the examples which follow, from which it is apparent that even in the absence of valuable byproduct metals the process may under certain circumstances have important practical and economic utility.

*Example A*

A survey of some of the more important iron ores treatable by the present invention will aid in disclosing the invention. The following ores, containing iron and as well varying contents of other metals, such as nickel, cobalt, manganese and chromium, and various other substances that go into the slag, may be successfully treated by the present method. The analyses of the selected ores are as follows, given in percentages:

| | Madagascar ore | New Caledonian ore (Garnierite) | Ural ore (Revdansk) | Canada ore |
|---|---|---|---|---|
| $F_2O_3$ | 60.5 | 12.6 | 20.25 | 3.0 |
| FeO | 2.3 | .9 | 3.60 | 2.1 |
| NiO | 1.5 | 7.0 | 12.00 | 9.0 |
| CoO | .13 | .11 | .12 | .15 |
| MnO | 2.5 | | .12 | .7 |
| $Cr_2O_3$ | .6 | | .23 | Traces |
| $Al_2O_3$ | 6.3 | .8 | .6 | .95 |
| MgO | 1.4 | 23.1 | 18.2 | 21.80 |
| CaO | .9 | .1 | .4 | .3 |
| $SiO_2$ | 7.8 | 45.4 | 32.1 | 42.1 |
| $P_2O_5$ | | .02 | .1 | .01 |
| S | .05 | .02 | .1 | .02 |
| Ignition losses | 10.06 | 10.0 | 12.2 | 9.6 |
| Total | 99.98 | 100.05 | 100.02 | 99.78 |

There are naturally other ore deposits in various localities which have generally similar contents. In the case of the well known Cuban iron ore (which is in proximity to a magnesium silicate or serpentine deposit), this contains over 65 percent of iron oxides, from 0.45 to 2.0 percent nickel oxide, a small quantity of cobalt oxide, some manganese oxide and some chromium oxide, thus resembling the above tabulated phosphorus-free Madagascar ore. The above table is to be understood as of the type in which certain of the recited constituents merely represent the original compounds; thus nickel oxide was usually the silicate in the ore, which is true also of the other metals generally, including part of the iron; and the total silicon of the original ore is represented in the table as silicon oxide. Similarly with aluminates, the aluminum thereof appearing as alumina. The greater part of the actual ore may be hematite $Fe_2O_3$.

The treatment proceeds preferably as follows, with respect to the recited Madagascar or other iron ore. First the ore is crushed and ground to a fineness of about 60 to 100 mesh, whereupon it is mixed with finely ground carbonaceous material; although naturally the ingredients may be mixed and then ground, with precautions to ensure very complete and intimate mixing. The carbon may be supplied in various solid forms, and there may be used anthracite or other coal, coke or petroleum coke, or even lignite, brown coal or turf; however, low-temperature-carbonisation coke and asphalt, such as the Trinidad or Cuban asphalt, are particularly suitable. Into the grinding or mixing apparatus is introduced powdered hydrated lime (or other basic hydroxide) in quantities sufficient to react chemically with all the silica and alumina present in the ore, with preferably a slight excess of the hydroxide.

The basic hydroxide, e. g. calcium or barium hydroxide, affords important functions in the process. It takes part in converting the troublesome silicates and aluminates to oxides. It engages or absorbs silica, for example as comprised in such compounds as $FeO \cdot SiO_2$. It does all this while operating at a relatively low temperature, below that of softening of the ore, and below that of water-loss from the hydroxide. For example, calcium hydroxide, a basic compound, retains its water of constitution up to about 580° (barium hydroxide to 750°), and the presence of such water component is important to the functioning of the agent, it being found that unslaked lime or calcium oxide CaO will not act similarly. In the presence of the basic or calcium hydroxide, particularly with steam present, and at the low temperatures mentioned, the silica present in any form in the ore tends desirably to enter into combination and to form calcium silicate $CaSiO_3$, which is a compound of light specific gravity and later easily separable from the values of the ore. Moreover when once formed, calcium silicate is a stable compound with a high heat of formation, about 375 cal. The hydroxide thus potentially separates the silica. Similar statements are applicable to alumina in the ore, it becoming converted to calcium aluminate; and corresponding observations apply if calcium hydroxide be replaced by barium or analogous basic hydroxide.

The heating operation is carried out, as in a rotary kiln, supplied with a current of steam for its atmosphere, or with a volatile organic material or gas, the latter gas being particularly obtainable from the carbonaceous part of asphalt or shale when included in the mix, thus dispensing with need of feeding the atmosphere to the kiln.

The main purpose or function of the active or other carbon in the mixture is to constitute a solid reducing agent for converting the higher to the lower oxides, performed with great thoroughness due to the fine crushing and mixing of the ingredients. The basic hydroxide promotes the conversions mentioned and, as already explained, acts further to absorb silica and convert to oxides any silicates or aluminates of the desired metals present.

The reactions converting the high to the low oxygen compounds are well known and need no elucidation. Ferrous oxide develops by reduction and by combination with ferric oxide the magnetic or ferroso-ferric oxide results.

The use of hydrated lime $Ca(OH)_2$ as the hydroxide is particularly suitable if the reaction in the rotary kiln can or must be for other reasons carried out at below 500° or 525°; in which case the reaction temperature is preferably maintained between about 450° and 525°. Above such temperatures the hydroxide tends to lose its water of constitution. But if a higher temperature is desired, then barium hydroxide is preferably used, since such agent is stable up to a temperature of 750°. Barium hydroxide is especially desirable if the kiln is fed with a current of steam.

The heat treatment, which is at such moderate temperatures as to avoid fusing and agglomeration, is continued until the iron compounds are transformed into the desired oxide, $Fe_3O_4$, corresponding to magnetite, and the other byproduct metals to their recoverable oxides. The entire mass of the progressing mixture remains in powdery or finely ground condition throughout the heat treatment, due to the restricted temperature, and this condition carries through, to the great advantage of the quenching and subsequent steps.

From the kiln, and still in absence of air or oxidizing atmosphere, the hot mixture, in fine condition, is next abruptly quenched in a cold liquid, preferably water to which hydrated lime or equivalent basic compound has been added, to form a saturated solution. The quenching apparatus may have means for progressing the mixture from its receiving to a delivery point. Preliminary separation may be performed in the first or quenching bath. For this purpose a mechanical device for continuous stirring is installed. In accordance with the density of the respective ingredients, the oxides of iron, nickel, cobalt and manganese gravitate to the bottom, whereas the remaining lighter materials pass into upper strata.

After delivery from the quenching apparatus the mixed products are subjected to more thorough separation. For example they are introduced into a known kind of separator, where the actual separation of the layers containing the values and the gangue is carried out. The iron compound may be separated from the other metal compounds; and each recovered in enriched form. All of the operations are of a continuous character. The quenching, separating and recovering steps are not more fully described, as they may be substantially conventional, although preferably continuous, and may parallel the corresponding steps as recited in copending application No. 381,320, filed March 1, 1941 relating to beneficiation of manganese ores patented September 29, 1942 No. 2,296,841.

The iron is obtained by this process in the form of its ferroso-ferric oxide, and therefore it can be separated from the nickel, cobalt and manganese oxides by one of the well established systems, such as magnetic separation, flotation or leaching. The several oxides are obtained in high purity.

An important feature hereof is the treatment of chromium oxide which may often be found in ores along with iron oxide, but which by prior methods becomes removed with the silicates. It is highly more profitable to obtain the chromium as its oxide, together with the iron oxide, according to this process, from which mixture the chromium can easily be removed in the known manner, or as above stated.

As an incidental factor in the process, in case asphalt has been used in the mix, it is possible to recover the resulting volatile matter; and as the gases generated or removed during the kiln operation contain largely or chiefly carbon monoxide, it is practicable to utilize these gases for heating purposes. Also, depending upon the particular case and formula in hand the silicates, aluminates and other resultants can sometimes be isolated and may have marketable value.

The proportions of the iron ore, the carbon and the basic hydroxide have been above indicated by their purposes. As an example, by weight, the proportions may be, for each 100 lbs. of ore, as follows. Assuming a typical case wherein the iron compounds are about 67% of the whole, by weight, or 67 lbs., and the compounds of the byproduct metals are 8 lbs., and the residue or gangue material 25 lbs.; the added carbon may then be of the order of 50 to 75 lbs. more or less, but always in excess of what is indicated as the need to bring about the reduction of the iron and byproduct compounds. A rough rule for the hydroxide is that it should be in as great a proportion as the estimated gangue or residue: or in the above case not substantially less than about 25 lbs. added for each 100 lbs. of ore, naturally with considerable latitude. In some cases the hydroxide may be so taken, and the carbon taken in twice that quantity, the carbonaceous material naturally in such a larger quantity as to afford that much active carbon. The temperatures of treatment should not exceed those stated while being high enough to ensure effective conversion reactions. The speed and distance of travel in the furnace or kiln, and consequently the duration of heat treatment, are readily determinable for any given case; as an example the kiln may be of the order of about 40 to 60 feet long and 1 to 2 feet in diameter, the progress 1½ to 2½ feet per minute, and the duration 20 to 30 minutes, more or less. The supplied atmosphere, as of steam, may move in either direction, preferably counter to the mixture progress, and in volume to ensure non-oxidizing conditions and to carry off the gaseous wastes. When the carbonaceous agent of the mixture yields gases containing carbon and/or hydrogen these sweep through to an outlet and dispense with a separate means of supply. The reactions involved are not necessarily all completed during the heating stage, since to some extent they may extend into the cooling or quenching step, the latter consisting of a quick return of the heated mixture to cool temperature; and the following separation, extraction or recovery steps may be performed at low or even room temperatures. The products of this example are the separated and recovered oxide compounds of the iron and other metals, in a highly enriched or beneficiated condition, well adapted for economical smelting or further metallurgical steps in arriving at the metallic iron or other metals, respectively.

*Example B*

The present invention has been demonstrated to be advantageously applicable in cases where the iron, and other metals which may be present, are in form of sulphides, and whether or not arsenic compounds thereof are present. The treatment is generally similar to that set forth in Example A, but with a preliminary treatment, to be described. The carbonaceous matter however, instead of being taken in roughly double the weight of the hydrated lime, is taken in substantially greater excess, this facilitating the elimination of the sulphur in the form of sulphur dioxide, and in the analogous elimination of phosphorous. It remains true that a certain amount of sulphur may tend to remain, in the form of calcium sulphide, preventable by passing steam in sufficient supply through the system.

In regard to ores containing large amounts of arsenic it is found that the totality of such arsenic may be successfully eliminated by the described steps, and the metallic oxides obtained free of arsenic.

In cases of iron ores containing cobalt compounds, besides nickel compounds, these it is found may be treated by this method with very satisfactory results.

In the preliminary step the sulphides are converted to oxides. The effect of oxygen on nickel or iron sulphides is an exothermic reaction, thus:

$$NiS + 1.5O_2 \rightarrow NiO + SO_2 + 110.3 Cal.$$
$$FeS + 1.5O_2 \rightarrow FeO + SO_2 + 116.3 Cal.$$

For the elimination of sulphur, etc., instead of passing steam, air can be used in the first heating step, or better yet an added ore containing an available surplus of oxygen, such as hematite or pyrolusite; in which case the gas flow should be counter to the mixture travel. If air be used, it is best to carry out the process in two separate chambers or rotary kilns, whereby through the first kiln air is passed, the resulting sulphur-containing gases being continuously removed, and thereupon the metal oxides formed to be heat-treated in a second chamber or kiln, in the complete absence of air, and preferably in presence of steam, as already stated, or a neutral gas, the resulting products going into the quenching apparatus, as before.

By the above illustrative examples it has thus been shown how iron ores, perhaps containing other valuable metals, can be treated in order to obtain a high grade or enriched iron compound directly available for the iron and steel industry, while the other valuable metals are at the same time recoverable in a suitable form for industrial use. The process so described is industrially applicable even for treating the lower grades of iron ores, and for those containing sulphur, arsenic or phosphorus, and for those containing titanium compounds. Where titanium oxide $TiO_2$ is present in the original ore it becomes converted during the present process to calcium titanate, which appears in the slag, and from which it is recoverable if desired. A case of value is the use of the process in treating chromite ores. In these various fields lies the utility of the present invention, and it is not recommended in cases where, upon examination, it is found not to be economically sound.

There has thus been described a process adapted for the beneficiation of iron ores and the recovery of byproduct values therefrom which embodies the principles and attains the objects of the present invention; but since many matters of operations, steps, and order thereof, as well as specific reactions and character of compositions and agents used, may be variously modified without departing from the principles of the invention, it is not intended to limit the invention to such matters except to the extent recited in the appended claims.

What is claimed is:

1. The process for beneficiating iron ores comprising mixing the crushed ore with minor proportions of a solid carbonaceous reducing agent, and a basic hydroxide; and treating such mixture in finely divided condition by first subjecting it to heating in a non-oxidizing atmosphere in a closed chamber, and at a reaction temperature below that at which the basic hydroxide tends to lose its water of constitution and well below that at which softening, fusing or agglomerating of mineral contents tends to occur, thereby to maintain the finely divided condition of the mixture; the basic hydroxide reacting with any silicon or aluminum compounds present, at such low temperature, thereby to combine with and withdraw them from undesirable combination with the iron; and terminating the heating after a substantial duration and abruptly quenching the mixture in liquid while continuing the prevention of oxidation; whereby during such heating and quenching treatment substantially all the iron compounds or oxides present are converted to ferroso-ferric oxide $Fe_3O_4$ and are fixed as such; with subsequent steps of separation and recovery of such converted iron compound as a beneficiated product.

2. The continuous process for beneficiating a low-grade iron ore containing ferric oxide, comprising mixing the crushed ore with minor proportions of a solid carbonaceous reducing agent, as coke, and a basic hydroxide of the group calcium or barium hydroxide, and treating such mixture in finely divided condition by first subjecting it to heating in a non-oxidizing atmosphere in a closed chamber, and at a reaction temperature below that at which the basic hydroxide tends to lose its water of constitution and well below that at which softening, fusing or agglomerating of mineral contents tends to occur, thereby to maintain the finely divided condition of the mixture; the basic hydroxide reacting with any silicon or aluminum compounds present, at such low temperature, thereby to combine with and withdraw them from undesirable combination with the iron; and terminating the heating after a substantial duration and abruptly quenching the mixture in liquid while continuing the prevention of oxidation; whereby during such heating and quenching treatment sulphur and phosphorus are eliminated and substantially all iron oxides present are converted to ferroso-ferric oxide $Fe_3O_4$ and are fixed as such; with subsequent steps of separation and recovery of such converted iron compound as a beneficiated product.

3. The process as in claim 2 and wherein with lime hydrate in mixture the temperature is kept between about 450° and 525°.

4. The process as in claim 2 and wherein with barium hydroxide in mixture the temperature is kept between about 550° and 750°.

5. The process as in claim 1 and wherein the carbonaceous agent is added in proportion of not under about 50 percent of the ore.

6. The process as in claim 1 and wherein the carbonaceous agent is added in proportion of not under about 50 percent of the ore, and the basic hydroxide in a somewhat less proportion, or about equal to the calculated amount of residues present in the ores.

7. The process as in claim 1 and wherein steam is supplied as a non-oxidizing atmosphere and maintained in flow through the chamber.

8. The process as in claim 2 and wherein the hydroxide is barium hydroxide and the atmosphere is superheated steam.

9. The process as in claim 1 and wherein the quenching is effected in a bath of water in which is dissolved a substantial or saturating proportion of a basic hydroxide as calcium hydroxide.

10. The process as in claim 1 as applied to ores containing sulfides of iron, wherein the mixture is subjected to preliminary heat treatment in a separate chamber or kiln wherein is caused an oxidation reaction to convert the sulfide compounds to oxides, and the sulphur product gases are flowed away.

11. The process as in claim 1 as applied to ores containing sulfides of iron, wherein the mixture is subjected to preliminary heat treatment in a separate chamber or kiln wherein is caused an oxidation reaction to convert the sulfide compounds to oxides, and the sulphur product gases are flowed away; oxygen being supplied by an air atmosphere admitted to the chamber.

12. The process as in claim 1 as applied to ores containing sulfides of iron, wherein the mixture is subjected to preliminary heat treatment in a separate chamber or kiln wherein is caused an oxidation reaction to convert the sulfide compounds to oxides, and the sulphur product gases are flowed away; oxygen being supplied by the inclusion in the mix of a solid agent, as hematite or pyrolusite, adapted under heat to yield oxygen for the main reaction of oxidizing the metal sulphur compounds.

13. The process as in claim 1 and wherein the ore treated contains compounds of byproduct metals of value, notably nickel, cobalt, manganese and/or chromium; which byproduct metals, in the form of oxides are present in the quenched mixture and become separated from the gangue and from the iron oxide in a form industrially available.

14. The process as in claim 1 and wherein compounds of the byproduct metals in the ore become converted to recoverable oxides thereof in the treated mixture.

15. The process as in claim 1 and wherein compounds of the byproduct metals in the ore become converted to recoverable oxides thereof in the treated mixture; including the sulphides of such metals after being converted by preliminary step to oxides.

16. The process for beneficiation of an iron ore by steps including the thermal reduction of the crushed ore in the presence of carbon, and quenching to fix the reduced compounds, while protecting the material from oxidation during reduction and quenching; characterized in that the ore is intimately premixed with substantial proportions of a solid carbonaceous agent and a basic hydroxide, all in finely divided condition, and in that the reaction temperature is maintained below that at which the basic hydroxide loses its water of constitution; whereby the basic hydroxide reacts to convert silicon and aluminum derivatives in the ore for later ready removal, while the carbon reacts to cause the reduction of iron compounds to ferroso-ferric oxide, and sulphur and phosphorous constituents are converted and eliminated in gaseous form, before quenching.

17. The process for beneficiation of an iron ore by steps including the reduction of the crushed ore in the presence of carbon, in a heating chamber, and quenching in a cooling chamber to fix the reduced compounds, while protecting the material from oxidation during reduction and quenching; characterized in that the ore is fed to the reaction chambers in intimate premixture with substantial proportions of a solid carbonaceous agent and of a basic hydroxide, all in finely divided condition, and in that the reaction temperature is maintained below that at which the basic hydroxide loses its water of constitution, and well below the softening temperature of the mixture; whereby the basic hydroxide reacts with the silicon and aluminum compounds of the ore to eliminate them.

18. The process as in claim 17 and wherein the carbonaceous ingredient of the mix is such as to yield during heating an organic volatile gas and thus to supply a non-oxidizing gas to the chamber, which may be drawn away and recovered, as for combustion and heating of the chamber.

19. The process as in claim 17 and wherein the quenching is by water provided with a strong or saturating quantity of a basic hydroxide.

20. The iron ore enriching process comprising thermal reduction of the iron compounds followed by quenching, and characterized by the premixing with the powdery ore of powdery carbonaceous material and a basic hydroxide, and restricting the thermal treatment to a moderate temperature incapable of softening or agglomerating the powdery mixture; such temperature being above about 450° and below about 750° in the case of barium hydroxide or below about 525° in the case of calcium hydroxide.

DANIEL GARDNER.